United States Patent [19]

Tieben

[11] Patent Number: 4,609,131
[45] Date of Patent: Sep. 2, 1986

[54] SEED DISPENSING DEVICE

[76] Inventor: James B. Tieben, Rte. 1, W. McArtor Rd., Dodge City, Kans. 67801

[21] Appl. No.: 618,924

[22] Filed: Jun. 11, 1984

[51] Int. Cl.⁴ ................................................ A01C 7/00
[52] U.S. Cl. .................................... 222/278; 222/266; 222/270; 222/271; 222/305; 222/330; 111/35; 221/237
[58] Field of Search ............... 222/278, 279, 288, 623, 222/305, 266, 269, 270, 271, 330; 221/234, 235, 266, 237; 111/34, 35, 8, 9, 73, 77, 80

[56] References Cited

U.S. PATENT DOCUMENTS

| | | | |
|---|---|---|---|
| 740,748 | 10/1903 | FitzMaurice | 111/8 |
| 845,200 | 2/1907 | Schaver | 222/279 X |
| 867,451 | 10/1907 | Umrath | 111/9 |
| 897,153 | 8/1908 | Rodies | 111/DIG. 14 |
| 1,168,859 | 1/1916 | Compton | 222/278 |
| 1,291,164 | 1/1919 | Royer | 111/80 |
| 1,452,625 | 4/1923 | Targosky | 111/8 |
| 1,966,966 | 7/1934 | Lenz | 111/80 |
| 2,164,333 | 7/1939 | Mann | 222/279 X |
| 2,547,867 | 4/1951 | Judson | 111/8 X |
| 4,379,664 | 4/1983 | Klein et al. | 111/73 X |

Primary Examiner—Joseph J. Rolla
Assistant Examiner—Frederick R. Handren
Attorney, Agent, or Firm—Willian Brinks Olds Hofer Gilson & Lione Ltd.

[57] ABSTRACT

A seed dispensing apparatus includes an upper grain flute housing which mounts a grain flute type seed dispensing system, as well as a lower seed plate housing which mounts a seed plate type dispensing system. Both the flute type dispensing system and the seed plate type dispensing system include respective drive shafts. By selecting and rotating the appropriate one of the drive shafts, the disclosed seed dispensing system can be used either to dispense relatively small seeds via the flute type dispensing system, or relatively large seeds via the seed plate type dispensing system.

10 Claims, 8 Drawing Figures

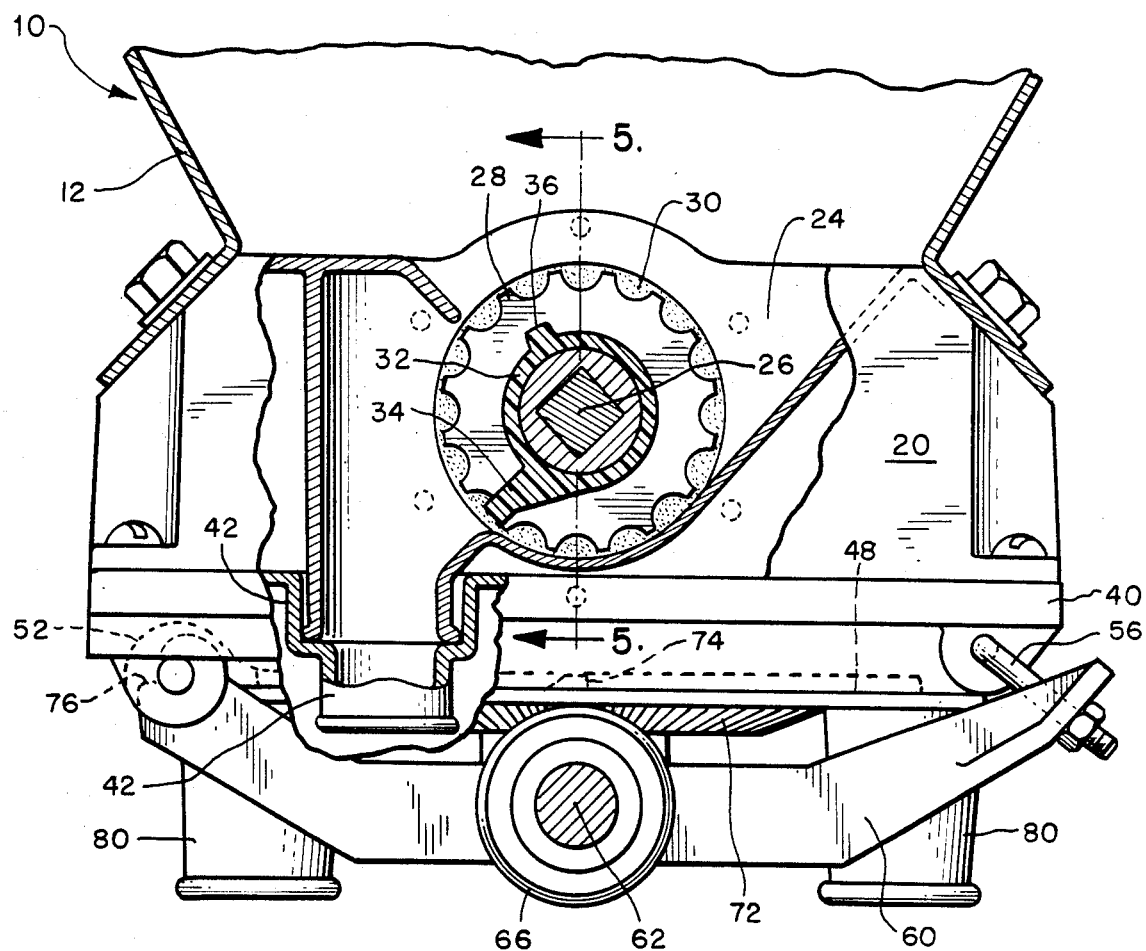
FIG. 4
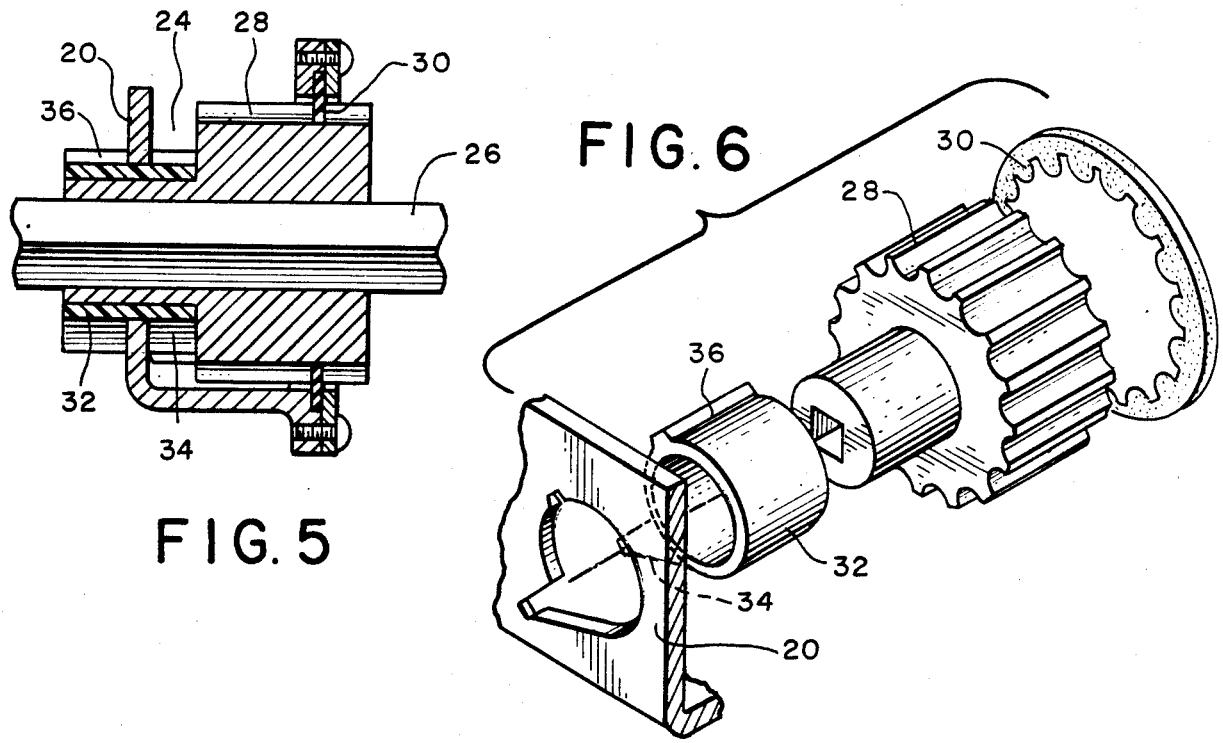
FIG. 5
FIG. 6

SEED DISPENSING DEVICE

BACKGROUND OF THE INVENTION

The present invention relates to an improved seed dispensing device which operates to dispense seeds having a wide variety of sizes reliably.

In the past, it has been conventional practice to utilize a seed plate type seed dispensing device for dispensing relatively large seed such as corn from a hopper during a planting operation. Furthermore, it has been conventional to use a grain flute type seed dispensing device to automatically dispense smaller seeds such as alfalfa seeds, for example, during a planting operation. Because the common practice to date has to use two separate types of seed dispensing devices, depending upon the size of the seed to be planted, it has in the past typically been necessary for a farmer to buy and maintain two separate and independent seed dispensing devices if he wished to automatically dispense the complete range of seed sizes commonly planted.

SUMMARY OF THE INVENTION

The present invention is related to an improved seed dispensing device which operates in a simple and reliable manner to dispense the entire range of conventionally planted seeds. In this way, the need for multiple seed dispensing devices is eliminated.

According to this invention, a seed dispensing device for dispensing seed from a seed hopper is provided which includes a flute housing which defines at least one chute extending through the flute housing. A flute is mounted to the flute housing in the chute to control the rate at which seed is dispensed out of the chute, and means are provided for defining a first seed tube opening aligned with the chute to receive seeds dispensed by the flute. In addition, a seed plate housing is aligned with the flute housing, and this seed plate housing defines at least one opening positioned to receive seed. A seed plate is mounted to rotate under the seed plate housing to control the rate at which seed is dispensed out of the opening, and means are provided for defining a second seed tube opening disposed under the seed plate to receive seeds dispensed by the seed plate. The flute operates to dispense relatively smaller seeds; the seed plate operates to dispense relatively larger seeds; and the flute and seed plate cooperate to dispense a wide range of sizes of seed.

By combining a flute type seed dispenser and a seed plate type seed dispenser in a single device, the present invention provides important economies. The need for two separate seed dispensers is eliminated, and a single seed dispenser is provided which operates with the entire range of commonly planted seed. In addition, the preferred embodiment described below includes two seed flutes and two locations on the seed plate which dispense seed. In this way, the single seed dispensing apparatus operates to dispense seed of either a relatively large or a relatively small size into two separate seed tube openings.

The invention itself, together with further objects and attendant advantages, will best be understood by reference to the following detailed description, taken in conjunction with the accompanying drawings.

BRIEF DESCRIPTION OF THE DRAWINGS

FIG. 4 is a sectional view taken along line 4—4 of FIG. 3.

FIG. 5 is an enlarged sectional view taken along line 5—5 of FIG. 4.

FIG. 6 is an exploded perspective view of components related to one of the grain flutes of the embodiment of FIG. 1.

DETAILED DESCRIPTION OF THE PRESENTLY PREFERRED EMBODIMENTS

Figure 1:
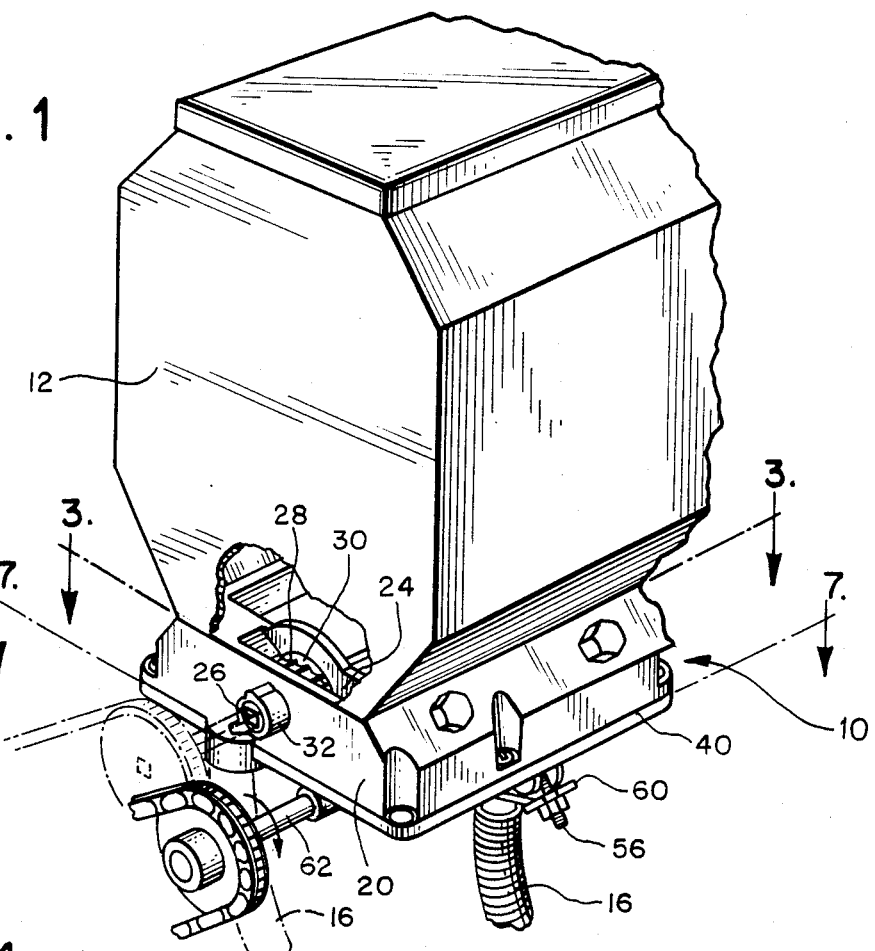
FIG. 1 is a perspective view showing a presently preferred embodiment of this invention mounted to a conventional seed hopper.
Figure 3:
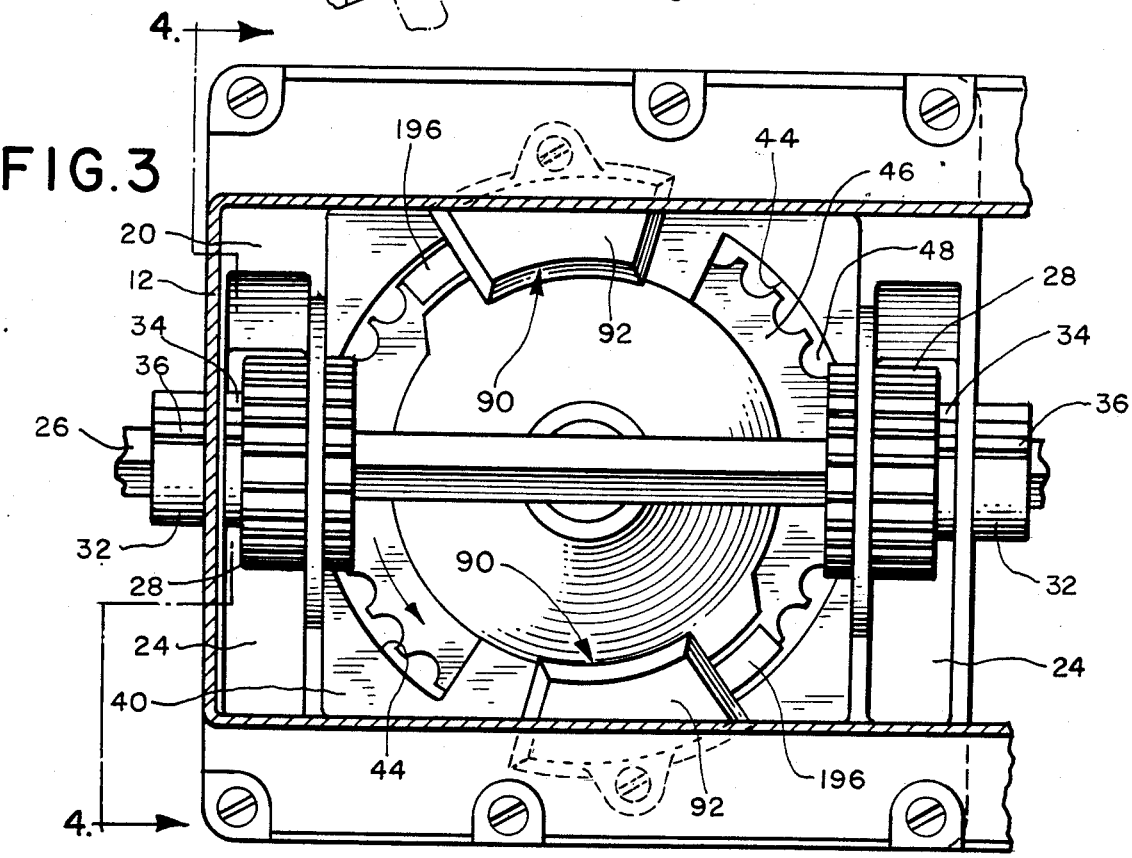
FIG. 3 is a sectional view taken along line 3—3 of FIG. 1.

Turning now to the drawings, FIG. 1 shows a perspective view of a conventional seed hopper 12, at the lower edge at which is mounted a seed dispenser 10 which incorporates the presently preferred embodiment of this invention. The seed dispenser 10 dispenses seed from the hopper 12 into two seed tubes 14,16 at a controlled rate.

Figure 2:
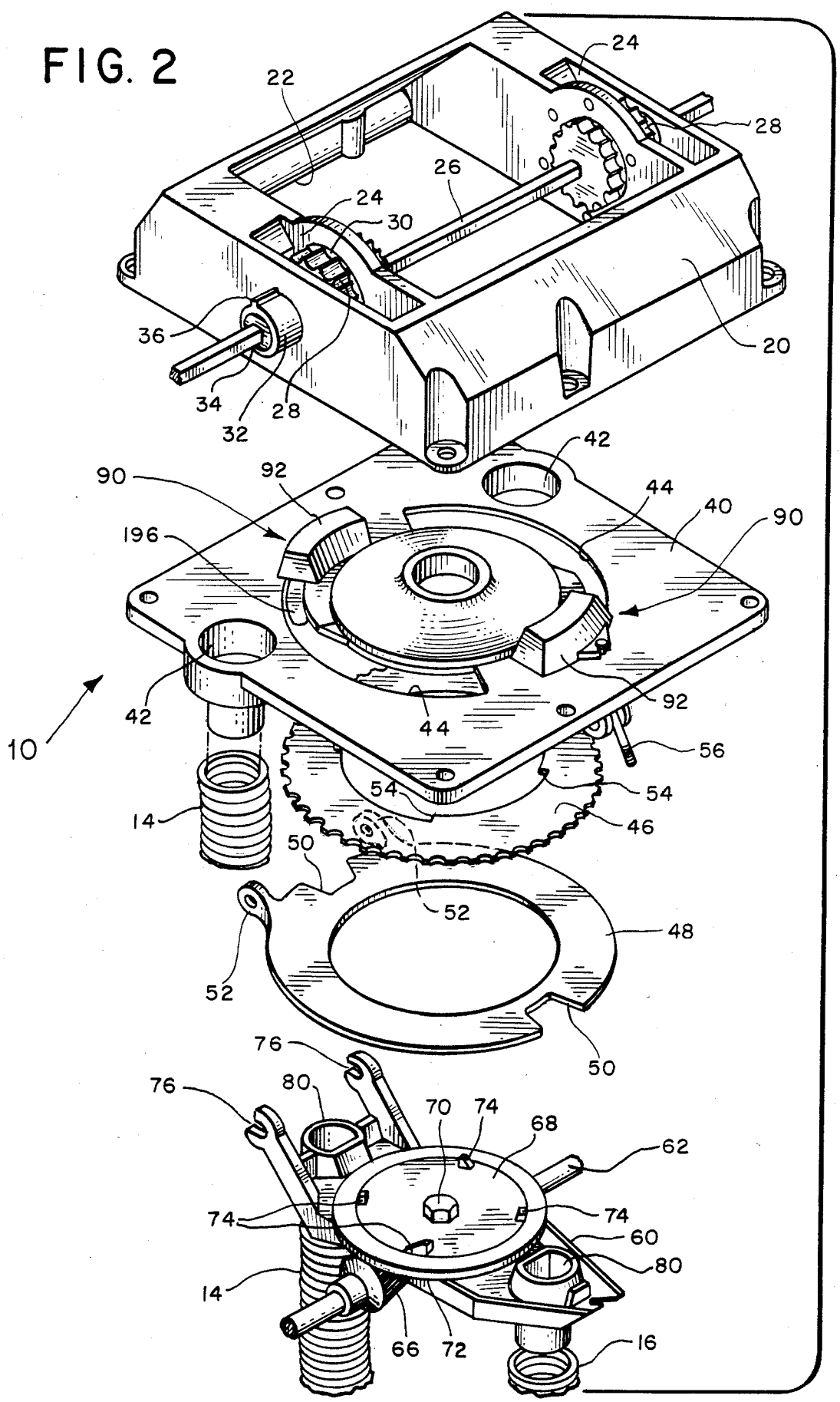
FIG. 2 is an exploded perspective view showing the various components of the seed dispensing apparatus of FIG. 1.

FIG. 2 is an exploded perspective view showing the various components of the seed dispenser 10 in greater detail. As shown in FIG. 2, the seed dispenser 10 includes at its uppermost edge a flute housing 20. This flute housing 20 defines a central passageway 22 which extends completely through the flute housing 20 from top to bottom. In addition, the flute housing 20 defines two chutes 24, each of which is disposed on a respective side of the central passageway 22, and each of which extends completely through the flute housing 20 from top to bottom. A flute shaft 26 is rotatably mounted in the flute housing 20 to extend through the two chutes 24 and across the central passageway 22.

As best shown in FIGS. 4-6, each of the flutes 28 passes through a respective seal 30 which is mounted to rotate in the flute housing 20. Each of the flutes 28 is configured to slide through the respective seal 30 to allow the effective width of the flute 28 to be adjusted. Each of the flutes 28 is rotatably supported in the flute housing 20 by means of a respective bearing 32. Each bearing 32 defines two generally radially extending ribs 34,36. These ribs 34,36 operate to block the portion of the chute 24 not occupied by the flute 28. The rib 34 prevents seed from passing under the bearing 32 and out the bottom of the chute 24, and the rib 36 prevents seed from passing over the bearing 32 and out the bottom of the chute 24. By sliding the flute 28 along the flute shaft 26, the effective width of the flute 28 (measured along the length of the ribs of the flute 28) situated within the chute 24 can be adjusted. This effective width determines the quantity of seed dispensed per unit of revolution of the flute 28. That is, the larger the effective width of the flute 28, the larger the volume of seed dispensed by the flute 28 with each revolution of the flute shaft 26.

The details of operation and structure of the flute 28 and the bearing 32 are well known to those skilled in the art, and will not therefore be described in any greater detail here. For the purposes of this description, it is enough to note that the flutes 28 operate in the conventional manner to dispense relatively smaller seeds out the chutes 24 at a rate linearly proportional to the rate of rotation of the flute shaft 26.

Returning to FIG. 2, the seed dispenser 10 also includes a seed plate housing 40 which is mounted directly below the flute housing 20. This seed plate housing 40 defines two spaced seed tube openings 42, each of which is situated under a respective one of the chutes 24. The two seed tubes 14,16 can be secured to the first seed tube openings 42 in order to conduct seed dispensed by the flutes 28 to the desired drop points.

The seed plate housing 40 also defines two arcuate open regions 44 which are situated under the central passageway 22. A seed plate 46 is mounted for rotation under the seed plate housing 40 such that the outer ridged perimeter of the seed plate 46 passes under the arcuate open regions 44. The seed plate 46 is held in place against the seed plate housing 40 by means of a seed plate retainer 48. This seed plate retainer 48 defines two diametrically opposed open regions 50, and the seed plate retainer 48 is pivotably mounted to the lower side of the seed plate housing 40 by means of two hinges 52. The seed plate 46 defines four regularly spaced drive surfaces 54, and the seed plate housing 40 defines a retainer clamp 56.

As best shown in FIG. 2, a seed plate drive 60 is mounted to the underside of the seed plate housing 40 by means of hinges 76. The seed plate drive 60 serves to mount a seed plate drive shaft 62 for rotation. A pinion gear 66 is mounted to rotate in unison with the shaft 62, and a drive plate 68 is mounted to rotate about an axis 70 on the seed plate drive 60. The drive plate 68 defines a ring gear 72 which meshes with the pinion gear 66. In addition, the drive plate 68 defines four drive lugs 74 positioned and configured to engage the respective drive surfaces 54 of the seed plate 46. Thus, rotation of the seed plate drive shaft 62 causes rotation of the drive plate 68, which in turn causes rotation of the seed plate 46. The seed plate drive 60 also defines a pair of opposed second seed tube openings 80, each of which is disposed under a respective one of the open regions 50 of the seed plate retainer 48. The two seed tubes 14,16 can be removed from the first seed tube openings 42 and placed on the second seed tube openings 80 when the seed plate 46 is used to dispense seed from the hopper 12.

Figure 7:
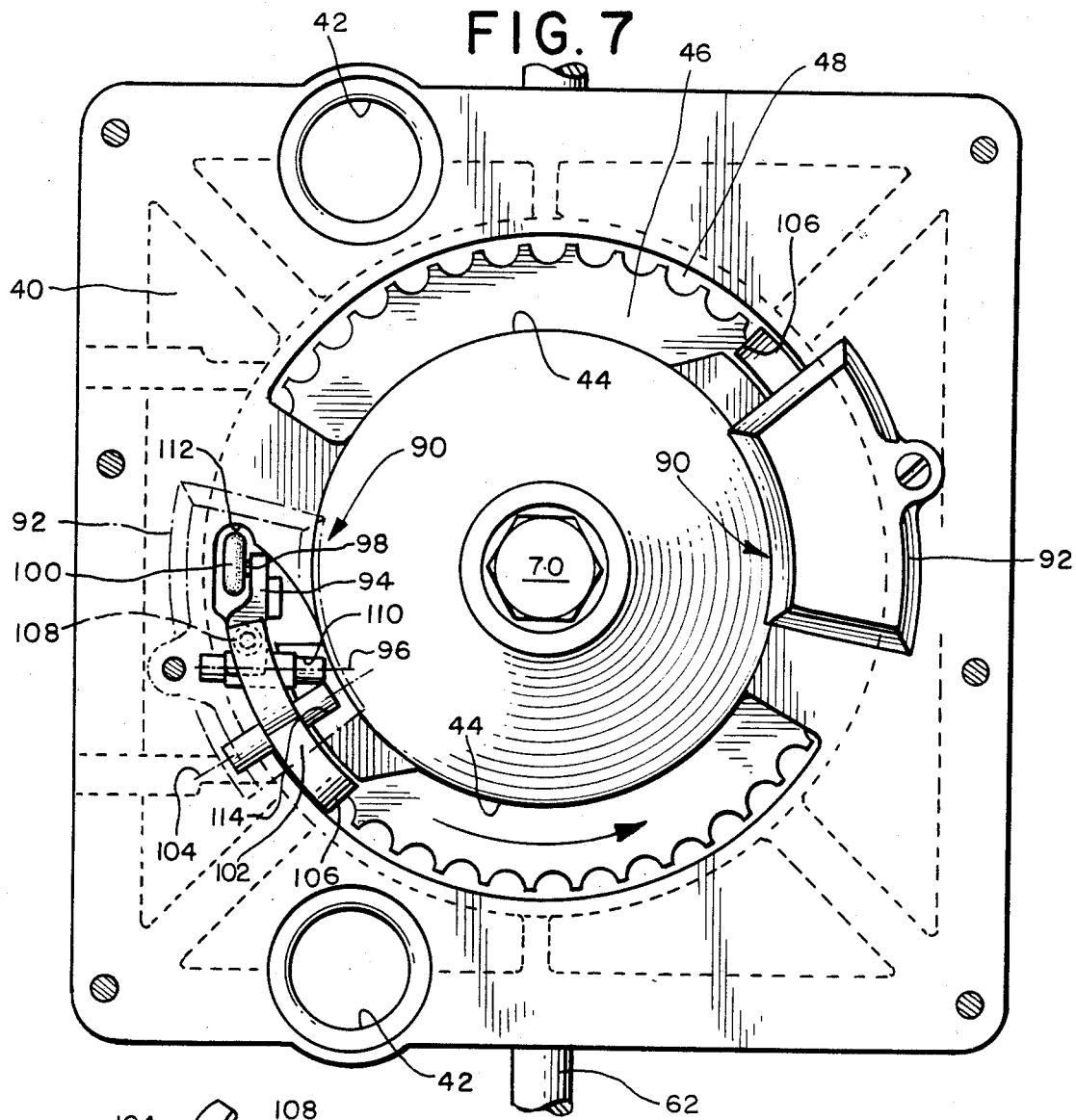
FIG. 7 is a sectional view taken along line 7—7 of FIG. 1.
Figure 8:
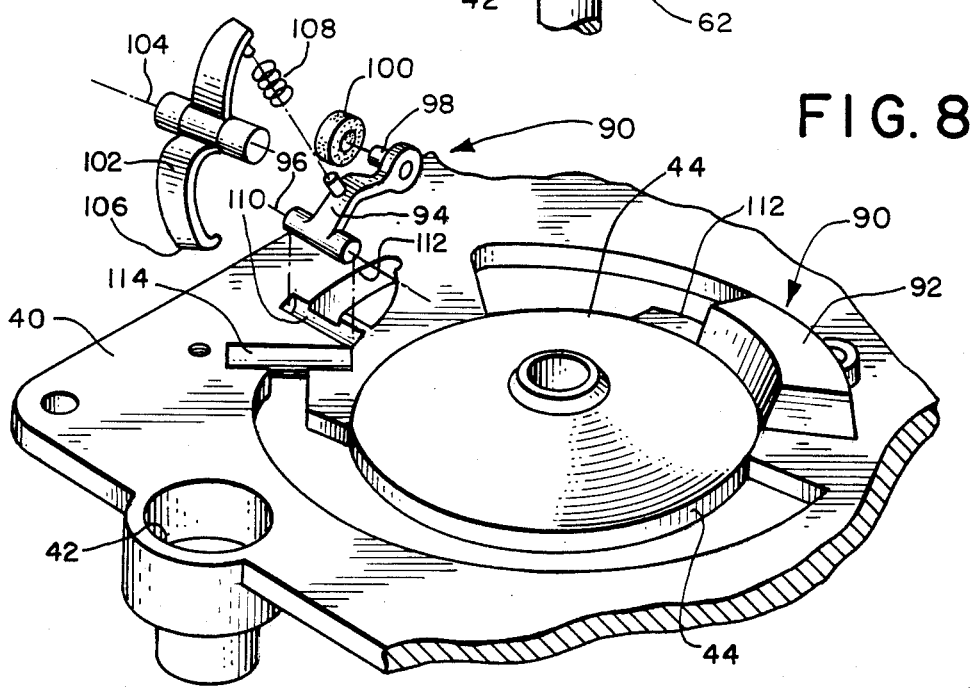
FIG. 8 is an exploded perspective view of one of the seed knocker assemblies included in the embodiment of FIG. 1.

FIGS. 7 and 8 show two views of one of the two seed knocker assemblies 90 which are mounted to the seed plate housing 40 as shown in FIG. 2. Each of these seed knocker assemblies 90 is enclosed within a respective housing 92 that is secured to the upper surface of the seed plate housing 40. Each seed knocker assembly 90 includes a respective mounting arm 94 which defines a pivot axis 96 and a mounting shaft 98. A roller 100, which can be for example a cylindrical roller formed of nylon, is rotatably mounted to the shaft 98.

Each seed knocker assembly 90 also includes a scraper arm 102 which defines a pivot axis 104 and a scraper surface 106. A compression coil spring 108 is interposed between the scraper arm 102 and the mounting arm 94 to bias the two arms 94,102 away from each other. The seed plate housing 40 defines a bearing 110 sized to receive the axis 96 of the mounting arm 94, as well as an opening 112 through which the roller 100 contacts the outer perimeter portion of the seed plate 46. In addition, the seed plate housing 40 defines a bearing 114 sized to receive the axis 104 of the scraper arm 102. The scraper surface 106 of each of the scraper arms 102 is positioned to contact the upper surface of the seed plate 46 through a portion of the arcuate open region 44.

The operation of seed plate type seed dispensers and seed knocker assemblies is well understood by those skilled in the art, and will not be described in any greater detail here for that reason. Here, it is enough to note that rotation of the shaft 62 causes rotation of the seed plate 46. As the seed plate 46 rotates under the seed plate housing 40, the depressions in the outer perimeter of the seed plate 46 are filled with seed which has passed through the central passageway 22 and one of the arcuate open regions 44. The scraper surfaces 106 operate to prevent seed resting on the upper surface of the seed plate 46 from reaching either of the seed tubes 14,16. The roller 100 operates to ensure that seed contained in the outer depressions of the seed plate 46 is dislodged from the seed plate 46 so as to fall through the open regions 50 into respective ones of the second seed tube openings 80. Thus, the seed plate 46 operates to dispense relatively larger seed via the seed tube openings 80 into the seed tubes 14,16.

The seed dispenser 10 is fabricated according to conventional engineering principles from standard materials. For example, the seed plate 46 can be of the type marketed by Lincoln Plastics Company of Lincoln, Nebr.

In operation, the seed dispenser 10 can be used either to dispense relatively small seed via the flutes 28 or relatively large seed via the seed plate 46. When the seed dispenser 10 is to be used with relatively small seed, a drive mechanism such as a conventional chain and sprocket drive (not shown) is disconnected from the seed plate drive shaft 62 and connected to the flute shaft 26. In this way, the seed plate 46 is maintained in a stationary position and the flutes 28 are made to rotate at a rate proportional to the desired rate of seed dispensing. The seed tubes 14,16 are positioned on respective ones of the first seed tube openings 42, and the second seed tube openings 80 may be plugged if desired.

When the seed dispenser 10 is to be used with relatively large seed, the drive arrangement (not shown) is disconnected from the flute shaft 26 and connected to rotate the seed plate drive shaft 62. Then the seed tubes 14,16 are disconnected from the first seed tube openings 42 and connected to the second seed tube openings 80. If desired, the first seed tube openings 42 can be plugged or diverting ramps can be placed over the chutes 24 to prevent seed from the hopper 12 from entering the chutes 24.

It should be apparent from the foregoing description that an improved seed dispenser has been described which utilizes a grain flute dispensing system for dispensing relatively small seeds and a seed plate dispensing system for dispensing relatively large seeds. In this way, a wide range of seeds can be dispensed reliably by a single apparatus, and the need for multiple seed dispensing devices is eliminated. Of course, it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

I claim:

1. A seed dispensing apparatus for dispensing seed from a seed hopper, said apparatus comprising:
   a fluted cylinder housing which defines at least one chute extending therethrough, said chute positioned to receive seed from the seed hopper;
   a fluted cylinder rotatably mounted to the fluted cylinder housing in the chute, said fluted cylinder defining an array of smaller seed receiving cavities adapted to control the rate at which smaller seed is dispensed out of the chute;
   means for defining a first seed tube opening disposed under the chute to receive seeds dispensed by the fluted cylinder;
   a seed plate housing defining at least one seed receiving opening positioned to receive seed from the hopper;
   a seed plate mounted to rotate under the seed plate housing, said seed plate defining an array of larger seed receiving cavities adapted to control the rate at which larger seed is dispensed out of the seed receiving opening;
   means for defining a second seed tube opening disposed under the seed plate to receive seeds dispensed by the seed plate;
   means for mounting the seed plate housing in vertical alignment with the fluted cylinder housing under the seed hopper, the upper one of the housings defining a passageway extending therethrough to conduct seed from the hopper to the lower one of the housings such that both the fluted cylinder and the seed plate operate to dispense seed from the hopper;
   said fluted cylinder operating to dispense relatively smaller seeds, said seed plate operating to dispense relatively larger seeds, and said fluted cylinder and seed plate cooperating to dispense a wide range of sizes of seed.

2. The invention of claim 1 wherein said at least one fluted cylinder comprises two fluted cylinders, one disposed on each side of the seed plate.

3. The invention of claim 1 further comprising means for defining a third seed tube opening disposed under the seed plate to receive seeds dispensed by the seed plate, wherein the seed plate operates to dispense seeds into both the second and third seed tube openings.

4. The invention of claim 1 wherein the fluted cylinder housing defines the passageway, and wherein the seed plate housing is disposed under the fluted cylinder housing such that the seed receiving opening is positioned to receive seed which has passed through the passageway.

5. A seed dispensing apparatus for dispensing seed from a seed hopper, said apparatus comprising:
   a fluted cylinder housing which defines a central passageway positioned to receive seed from the seed hopper;
   means for defining first and second seed tube openings positioned on opposed sides of the central passageway to receive seed from the seed hopper;
   first and second fluted cylinders, each rotatably mounted to the housing, said fluted cylinders each defining an array of smaller seed receiving cavities adapted to control the rate at which relatively smaller seeds are dispensed into the first and second seed tube openings, respectively;
   a seed plate housing, mounted under the fluted cylinder housing, which defines an open region;
   a seed plate rotatably mounted under the seed plate housing, said seed plate defining an array of larger seed receiving cavities adapted to receive relatively larger seed which has passed from the seed hopper through the central passageway of the fluted cylinder housing and the open region of the seed plate housing; and
   means for defining third and fourth seed tube openings under respective portions of the seed plate housing and the seed plate;
   said seed plate operating to control the rate at which relatively larger seeds are dispensed into the third and fourth seed tube openings;
   said fluted cylinders and seed plate cooperating to dispense a wide range of sizes of seed.

6. The invention of claim 5 wherein the fluted cylinders are mounted on a common fluted cylinder shaft to rotate in unison.

7. The invention of claim 6 further comprising a seed plate drive shaft oriented parallel to the fluted cylinder shaft.

8. The invention of claim 5 wherein the third and fourth seed tube openings are positioned on respective sides of the seed plate housing such that the third seed tube opening is between the first and second seed tube openings on one side of the seed plate housing and the fourth seed tube opening is between the first and second seed tube openings on the opposed side of the seed plate housing.

9. The invention of claim 6 wherein the fluted cylinders are slideable along the fluted cylinder shaft to control the effective widths of the fluted cylinders and therefore the rate at which seed is dispensed by the fluted cylinders.

10. The invention of claim 5 further comprising first and second seed knocker assemblies, each comprising:
    a mounting arm pivotably mounted to the seed plate housing;
    a roller rotatably mounted to the mounting arm to roll along an outer region of the seed plate over a respective one of the third and fourth seed tube openings in order to dislodge seeds from the seed plate;
    a scraper arm pivotably mounted to the seed plate housing to prevent seeds resting on an upper surface of the seed plate from reaching the respective one of the third and fourth seed tube openings; and
    a spring interposed between the mounting arm and the scraper arm to bias the roller into engagement with the seed plate and the scraper arm into engagement with the upper surface of the seed plate.

* * * * *